United States Patent Office 2,899,302
Patented Aug. 11, 1959

2,899,302

NICKEL-SILICON-BORON ALLOYS

Arthur T. Cape, Los Angeles, Calif., and Charles V. Foerster, West Englewood, N.J., assignors to Coast Metals, Inc., Little Ferry, N.J., a corporation of Delaware No Drawing. Application February 6, 1958
Serial No. 713,571

3 Claims. (Cl. 75—170)

This invention relates generally to nickel-silicon-boron alloys, but has reference more particularly to alloys of this type which are used primarily for brazing steel parts.

The diffusion in stainless steels of nickel-base brazing alloys containing silicon and boron has been described in the copending application of A. T. Cape, Serial No. 742,779, filed June 18, 1958. This diffusion renders the stainless steel susceptible to intergranular corrosion, and Huey tests, which consist of immersing a sample in boiling nitric acid for specified intervals and then measuring the loss of weight, have produced intergranular corrosion in specimens bonded with a composition consisting essentially of 90% nickel, 2.9% boron, 4.7% silicon, with the remainder residual elements, such as iron, manganese, etc.

This penetration or diffusion was, at first, attributed to the selective or preferential diffusion of boron, but tests which we have performed, substantiate the fact that the brazing alloy penetrated as a whole, and that there was no preferential diffusion of boron in the stainless steel.

In the aforesaid application, the substitution of cobalt, in substantial amounts, in such brazing alloys, for a part of the nickel, has been suggested as a means of reducing the diffusion, so as to obtain stronger brazed structures. In many cases, the reduction in the degree of diffusion thus effected was sufficient, specially where the sections to be brazed were very thin, i.e., of the order of .0015″ to .005″. However, for some structures, it has been found necessary to completely avoid or inhibit diffusion.

We have found, as the result of further work in reducing or eliminating the diffusion effect, that if at least one of the elements, titanium, niobium and tantalum, in a predetermined amount, is added to a nickel-base brazing alloy containing silicon and boron, or to an alloy such as described in the aforesaid copending application, that the diffusion of the brazing alloy in the stainless steel is eliminated or reduced to an inconsequential value. In some cases, any two of the above elements may be used in combination, or all three may be used in combination. In this connection, it is to be noted that titanium is many times as potent as niobium and tantalum in reducing or eliminating the diffusion effect which has been described.

In general, we have found that alloys containing the following ingredients, within the ranges stated, will not diffuse to any appreciable extent in the brazed structure:

|  | Range, percent | Example | | |
| --- | --- | --- | --- | --- |
| Carbon | 0 to 1 | 0.2 | 0.3 | 0.4 |
| Cobalt | 0 to 30 |  | 2.5 | 20.0 |
| Boron | 0.25 to 5 | 2.7 | 2.7 | 2.7 |
| Silicon | 0.1 to 5 | 4.7 | 3.2 | 3.2 |
| Titanium | 0.05 to 2 | .5 | .1 | .1 |
| Niobium | 0.5 to 5 |  | 1.4 | 1.4 |
| Tantalum | 0.5 to 5 |  |  |  |
| Chromium | 0 to 20 |  |  |  |
| Manganese | 0 to 15 | .8 | .8 | .8 |
| Iron | 0 to 15 | 1.0 | 1.0 | 1.0 |
| Nickel | Remainder | 90.1 | 88.0 | 70.4 |
|  |  | 100.0 | 100.0 | 100.0 |

It will be understood that various changes in the aforesaid alloys may be made, within the scope of the appended claims.

Having thus described our invention, we claim:

1. An alloy consisting of .25 to 5% boron, .1 to 5% silicon, at least one element of the group consisting of titanium, niobium and tantalum, in an amount sufficient to substantially eliminate the diffusion of the alloy into stainless steel, when used to braze stainless steel parts, titanium, when present, being present in an amount of from about .05% to about 2%; niobium, when present, being present in an amount of from about .5% to about 5%, and tantalum, when present, being present in an amount of from about .5% to about 5%, the remainder being substantially all nickel.

2. An alloy, as defined in claim 1, containing cobalt in amounts up to about 30%.

3. An alloy, as defined in claim 1, containing chromium in amounts up to 20%, manganese in amounts up to 15%, and iron in amounts up to 15%.

References Cited in the file of this patent

UNITED STATES PATENTS 2,688,536  Calloway et al. _____ Sept. 7, 1954